(12) United States Patent
Fabbri et al.

(10) Patent No.: US 9,459,372 B2
(45) Date of Patent: Oct. 4, 2016

(54) METHOD AND DEVICE FOR DETECTING AN OBJECT WITH BACKGROUND SUPPRESSION

(75) Inventors: Alberto Fabbri, Bazzano (IT); Sara Faetani, Bologna (IT); Davide Lazzarin, Bologna (IT); Danilo Naldi, Bologna (IT)

(73) Assignee: DATALOGIC IP TECH S.R.L., Lippo di Calderara di Reno (BO) (IT)

( * ) Notice: Subject to any disclaimer, the term of this patent is extended or adjusted under 35 U.S.C. 154(b) by 278 days.

(21) Appl. No.: 13/984,394

(22) PCT Filed: Feb. 15, 2011

(86) PCT No.: PCT/IB2011/000281
§ 371 (c)(1),
(2), (4) Date: Sep. 13, 2013

(87) PCT Pub. No.: WO2012/110837
PCT Pub. Date: Aug. 23, 2012

(65) Prior Publication Data
US 2013/0341495 A1     Dec. 26, 2013

(51) Int. Cl.
*G01V 8/10* (2006.01)
*G01S 7/493* (2006.01)
(Continued)

(52) U.S. Cl.
CPC .................. *G01V 8/10* (2013.01); *G01S 7/493* (2013.01); *G01S 7/497* (2013.01); *G01S 17/026* (2013.01); *G01S 17/48* (2013.01)

(58) Field of Classification Search
CPC ............ G01V 8/10; G01V 8/20; G01V 8/12; B65H 7/125; B65H 7/14; G01S 7/493; G01S 7/497; G01S 17/026; G01S 17/48; F16P 3/142; F16P 3/14; G01F 23/2921; G01F 23/292; A24C 5/3412; A24C 5/328; B07C 5/342; B07C 5/126; B07C 5/10; B07C 5/3416; G06K 13/067; G01N 21/90; G01N 21/9054; G01N 21/9018; G01N 21/9036

USPC .......... 250/214.1, 221, 222.1, 223 R, 223 B, 250/224
See application file for complete search history.

(56) References Cited

U.S. PATENT DOCUMENTS 4,659,939 A     4/1987 Lorenzo
4,899,041 A     2/1990 Fetzer et al.
(Continued)

FOREIGN PATENT DOCUMENTS

DE        19721105 A1     11/1998
DE        19951557 A1     5/2000
(Continued)

OTHER PUBLICATIONS

International Search Report and Written Opinion dated Sep. 19, 2011 from corresponding International Application No. PCT/IB2011/000281.

*Primary Examiner* — Que T Le
(74) *Attorney, Agent, or Firm* — Duane Morris LLP

(57) ABSTRACT

A background suppression device includes emitting means emitting a light beam emitted in a set direction and optoelectronic receiving means of a light beam reflected by an object providing a first and a second signal, and processing means which, in the detecting condition of the device, receives the first and second signal and provides an output information signal, in function of the first and second signal, indicating the presence or the absence of the object within an interval of set distances. The processing means stores, in a calibrating condition, the first and second signal and provides the output information signal in function of the first and/or of the second signal in the detecting condition and of the first and/or second signal in the calibrating condition. In the calibrating condition the object is absent and accordingly the first and second signal in the calibrating condition store the background.

29 Claims, 5 Drawing Sheets

(51) Int. Cl.
  *G01S 7/497* (2006.01)
  *G01S 17/02* (2006.01)
  *G01S 17/48* (2006.01)

(56) References Cited

U.S. PATENT DOCUMENTS

| | | |
|---|---|---|
| 6,157,040 A | 12/2000 | Bauer |
| 6,380,532 B1 | 4/2002 | Christensen |
| 7,012,539 B2 * | 3/2006 | Waslowski ............ G01S 17/026 250/221 |
| 2003/0059087 A1 | 3/2003 | Waslowski et al. |

FOREIGN PATENT DOCUMENTS

| | | |
|---|---|---|
| DE | 10138609 A1 | 2/2003 |
| DE | 102008020416 B3 | 9/2009 |
| EP | 307714 A1 | 3/1989 |
| EP | 1512992 A1 | 3/2005 |

* cited by examiner

METHOD AND DEVICE FOR DETECTING AN OBJECT WITH BACKGROUND SUPPRESSION

BACKGROUND AND SUMMARY OF THE INVENTION

The present invention relates to a method and to a device for detecting an object with background suppression.

In particular, the term "device for background suppression" indicates an optoelectronic sensor that is able to detect the presence of an object inside an interval of set distances indicated, in general, by the term 'field'.

In particular, the background suppression device is able to detect the presence of an object inside a pre-established distance interval comprised between the background suppression device and a set limit distance (also called cut-off distance), beyond which the presence of any object is ignored, which thus becomes part of the 'background'. The background suppression device provides an information signal with which it is possible to associate alternatively a first logic or a second logic state indicating respectively the presence or the absence of an object within the cut-off distance.

The background suppression devices comprise a photoemitter that is suitable for emitting a light beam in a specific direction for detecting objects and photoreceiving means that is suitable for receiving at least partially, through the principle of optical triangulation, the light beam reflected by an object. Typically, these devices are used in the sector of industrial automation, of packaging machines or of the food industry, for example to check the presence of an object conveyed on conveyors or on conveyor belts, and are installed on one side of the conveyor or the belt to emit the light beam, at a frequency that is equal to the required sampling frequency, towards the conveyor. The cut-off distance is not in general pre-settable a priori when the device is manufactured, as it depends on the particular manner of use of the device. Thus each installation of the device is typically preceded by an optical adjustment procedure, by means of which an operator is able to adjust the device so that the cut-off distance is set. Beyond the cut-off distance the background starts, which may, for example, comprise a wall of the conveyor or the conveyor itself.

In detail, the photoemitter emits a light beam in the direction of the object, which is reflected by the object at an angle that depends on the distance of the object from the photoemitter, i.e. the nearer the object, the greater the reflection angle. The photoreceiving means makes a first and second analogue electric output signal available, the values of which, considered together, are in correlation with the presence of the object within the cut-off distance. Processing means receives the first and second signal and provides the information signal indicating the presence or the absence of the object.

Background suppression devices of mechanical or electronic type are known.

In background suppression devices of mechanical type, the photoreceiving means comprises two distinct adjacent photoreceivers: a first photoreceiver makes a first signal available and is arranged in such a manner as to receive light beams reflected by objects arranged as far as the cut-off distance; a second photoreceiver makes a second signal available and is arranged in such a manner as to receive beams reflected beyond the limit distance.

Consequently, by comparing together the first and the second signal, it is possible to obtain a differential information signal correlated to the presence of the object inside the field. In fact, if the object is present, the light reflected by the object impinges the first photoreceiver more than the second receiver, the first signal therefore has a greater amplitude than the second signal, and thus the background suppression device can provide an output information signal, the logic state of which indicates the presence of the object. On the other hand, if the light reflected by the object impinges the second photoreceiver more than the first photoreceiver, because light is mainly received beyond the limit distance, the first signal has a smaller amplitude than the second signal and the output signal is not activated. In other words, the sign of the difference between the two signals means that the output signal changes from a first to a second logic state or not, to indicate the presence of an object or only the reflection by the background.

In background suppression devices of electronic type photoreceiver means is used that consists of a PSD (Position Sensitive Device). The photoreceiver means has a semiconductor material layer provided at the ends with two electrodes through which the first and the second signal are made available.

The principle according to which the reflection angle of the light beam depends on the distance of the object from the photoemitter still remains valid, but the photoreceiver means, instead of comprising two distinct photoreceivers, exploits the property of the layer of semiconductor material of being sensitive to the position in which the layer is impinged by the reflected light beam. In this manner, the position in which the layer is impinged determines the value of the amplitude of the first and of the second signal and thus, by comparing the amplitude of the first and of the second signal, it is possible to provide a differential output information signal the logic state of which indicates the presence or absence of the object, in a similar way what has already been said for background suppression of mechanical type.

The background suppression devices disclosed above have the drawback of being imprecise in detecting objects that have zones of different colours or which are shiny. Switching between the aforesaid two logic states, i.e. the information on the presence/absence of the object inside the 'field' is in fact influenced by the reflective power of the object and the background suppression device may or may not detect an object, depending on the reflective power and/or the colour thereof.

For example, if an object has portions of two contrasting colours such as black and white or portions that are more or less reflective, the amplitude of the first and of the second signal mainly depends on the reflection of the white part, which is much more reflective than the black part, rather than the position of the object within the interval of set distances. The differential information signal, owing to the difference between the amplitude of the first and of the second signal, could indicate the absence of the object even if it is present. The background suppression device would be deceived.

A similar problem also occurs in the presence of a very reflective object that may spuriously give rise to reflected light beams, which, received by the background suppression device, are such as to deceive the background suppression device.

From U.S. Pat. No. 6,380,532, in order to resolve the problem of light beams reflected spuriously from shiny objects, making a background suppression device of mechanical type is known in which at least three distinct photoreceivers are associated with the photoemitter, in particular four distinct photoreceivers in a specific embodiment. The plurality of distinct photoreceivers are arranged adjacent on opposite sides to the photoemitter and are connected electrically together in a suitable manner to minimise the possibility that spurious reflections coming from the background or from shiny objects give rise to an incorrect information signal indicating the presence of an object.

The solution illustrated by U.S. Pat. No. 6,380,532 has the drawback that the mechanical complexity, the cost and the overall dimensions of the background suppression device are increased because of the increased number of photoreceivers present. In addition, the device illustrated by U.S. Pat. No. 6,380,532 does not completely resolve the problem of identifying the presence of a reflective object inside the limit distance.

In fact, in the case of an object made of reflective material, the light beam reflected therefrom can be directed outside the receiving means. In this case, as no photoreceiver of the background suppression device would receive reflected light, all the signals associated with the respective photoreceivers would coincide with or be equal to 0 and accordingly this situation would give rise to an output information signal the logic state of which would indicate the absence of the object.

The background suppression device would thus be deceived by the reflective object and would not be able to identify the presence thereof, albeit increasing the number of photoreceivers present.

The object of the present invention is to make a background suppression device that is free of the drawbacks disclosed above, in particular a device that is able to detect reflective objects.

According to the present invention, a background suppression device is made, as disclosed in claim 1.

According to the present invention, there is provided a method for detecting an object with background suppression as disclosed in claim 17.

Owing to the present invention, the background suppression device is able to identify an object, even if it is reflective inasmuch as, taking account of the first and of the second signal in a detecting condition and in a calibrating condition, the information signal indicating the presence or the absence of the object is not only directly a function of the fact that the reflected light beam impinges the first photoreceiver or the second receiver more but is also correlated with the first and the second signal stored in a set condition that is the calibrating condition.

In particular, according to one embodiment of the present invention, each variation on the first or the second signal in the detecting condition compared with the value of the respective first and second signal in the calibrating condition, a variation that is outside a respective permitted threshold interval, is interpreted as the presence of the object inside the cut-off distance. The calibrating condition corresponds to acquiring the first and the second signal in the absence of the object, i.e. to acquiring and storing the first and the second signal influenced only by the background. This accordingly enables an object to be identified as present even if the reflected light beam is directed by the object outside the receiving means, this condition being nevertheless different from the calibrating condition i.e. from acquisition of the background.

BRIEF DESCRIPTION OF THE DRAWINGS

The invention can be better understood and implemented with reference to the attached drawings that illustrate embodiments thereof by way of non-limiting example, in which.

DETAILED DESCRIPTION

Figure 1:
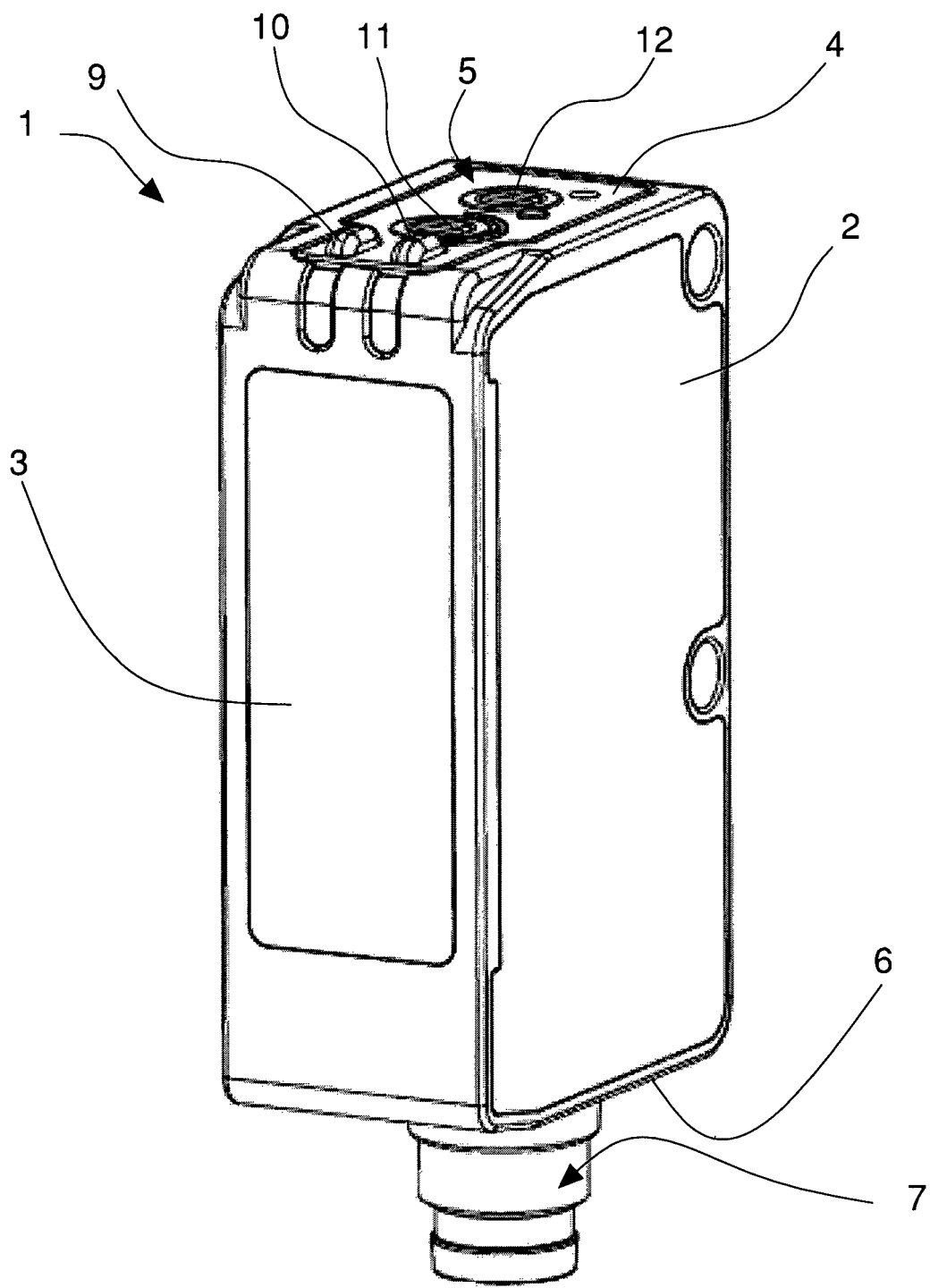
FIG. 1 shows a perspective view of a background suppression device according to the invention.

In FIG. 1 there is illustrated a background suppression device 1 according to the invention, which comprises an external container 2 provided with a frontal face 3, that has one at least partially transparent portion, with a head face 4 provided with interface means 5 for the interaction of an operator with the device 1, and with a bottom face 6. The bottom face 6 is provided with connecting means 7 for connecting and integrating the device 1 with an automation and/or external control system (which is not shown), that is able to receive an output information signal provided by the device 1. The information signal indicates the presence or absence of an object 18 within an interval of set distances, i.e. between the suppression device 1 and a set limit distance 8 (see FIGS. 2, 4, 6, and 8) which is the cut-off distance. Beyond the cut-off distance 8, the presence of any object is ignored, which thus becomes part of a background 20.

It is observed that the device 1 is able to operate within an interval of operational work distances that goes from the device 1 to a minimum operating distance, for example 50 mm, up to a maximum operating distance, for example 150 mm. The cut-off distance 8, which is the set limit distance of the interval of set distances and depends on the particular operating mode of the device 1, is in other words selectable in the interval of operational work distances, for example in the interval from 50 mm to 150 mm from the device 1.

The output information signal that the device 1 provides is a digital signal that may take on a high or low logic state to indicate respectively the presence or the absence of the object 18.

For the configuration of the logic state of this information signal, the device 1 is able to receive via a light/dark contact (which is not shown) of this connecting means 7 a remote light/dark digital signal provided by the automation system and/or external control that is, for example, part of the packaging machine in which this device 1 is installed. If the light/dark contact is floating, i.e. is not connected to the automation and/or external control, or if the automation system and/or external control provides a light/dark signal to the low logic state, it is considered that the device 1 is set to light mode and in other words the information signal is a normally low digital signal that switches and becomes high in the presence of the object 18. If on the other hand the light/dark contact is connected to the automation system and/or control, which provides a light/dark signal for the high logic state, it is considered that the device 1 is set to dark mode and the information signal is in other words a normally high digital signal, which switches and becomes low in the presence of the object 18, i.e. becomes active on the background 20.

Below, and without loss of generality, it is understood that the device is set to light mode.

The interface means 5 comprises indicating means, which is typically made with a green LED 9 and a yellow LED 10, which are suitable for indicating to an operator respectively the presence of the supply and the high logic state of the output. The yellow LED 10 comes on if the digital information signal is active and thus in the presence of the object 18.

The interface means 5 further comprises adjusting and calibrating means for enabling an operator to configure the device 1. In detail, the adjusting and calibrating means comprises an optical adjustment trimmer 11, which is usable by an operator in association with the yellow LED 10 for a cut-off distance 8 adjusting procedure, and a calibration trimmer 12 that is usable according to the invention by an operator to make the device 1 enter a calibrating procedure of the device 1. The calibrating procedure, as we will see, also comprises the optical adjustment procedure.

It is pointed out that in alternative embodiments of the device 1 of the present invention and without loss of generality, the calibration trimmer 12 is replaceable by a multi-position input element, for example a push-button.

As shown in FIGS. 2, 4, 6 and 8, the background suppression device comprises emitting means 13, for emitting a light beam 14 and receiving optoelectronic means 15 for receiving the reflected light beam 16, the light beam being emitted orthogonally through and received through the transparent portion of the front face 3. The fixed receiving means 15 comprises a first photoreceiver 17, the NEAR photoreceiver, for receiving the light beam 16 reflected by an object 18 within the cut-off distance 8, and a second photoreceiver 19, the FAR photoreceiver, for receiving the reflected light beam from the background 20. The first 17 and the second 19 photoreceiver are arranged adjacent and a transition zone (which is not illustrated) of non-sensitive material is interposed between the first 17 and the second 19 photoreceiver.

The emitting means 13 comprises a focussing lens (of known type) that is able to focus the light beam 14 emitted at a corresponding focussing distance, at which the light beam 14 has a minimum diameter. Nevertheless, it is advantageous for the purposes of the present invention, as illustrated better below, to exclude this focussing distance from the interval of operational work distances, i.e. act in such a manner that the emitted light beam 14 is not in focus when it impinges the background 20, and has a set diameter that is greater than a desired minimum diameter value.

According to one preferred, alternative embodiment of the emitting means 13, the emitting means 13 comprises a laser source and a collimating lens (of known type) and the emitted light beam 14 is a 'substantially' collimated light beam. It is noted that the beam is 'substantially' collimated inasmuch as, for example, there is a divergence of 20 milliradiants inside the aforesaid interval of operational work distances. Also in this case, it is advantageous for the diameter of the emitted light beam 14 to have in the interval of operational work distances a set diameter that is greater than a desired minimum diameter value.

In the case of a focussed emitted light beam 14, to act in such a way that the beam 14 has a set diameter that is greater than the desired minimum value when it impinges the background 20, the entire interval of operational work distances of the device 1 does not comprise the focussing distance. If, on the other hand, preferably the beam 14 is substantially collimated, for the beam 14 a set diameter value of interest is selected and although the divergence of an actual collimated beam is considered to be inevitable, this divergence is contained in the interval of operational work distances.

For a focussed or collimated emitted beam, the minimum desired diameter value in the interval of operational work distances is equal to 2 mm, preferably at least equal to 3 mm and it is in particular advantageous that the emitted light beam 14 has a diameter comprised between 3 mm and 5 mm.

The device 1 further comprises processing means 25, suitable for receiving a first 21 and a second 22 signal that are respectively associated with the first 17 and with the second 19 photoreceiver and for providing the output information signal 26 indicating the presence or the absence of an object 18. The first 21 and the second 22 signal are shown in FIGS. 3, 5, 7 and 9.

The background suppression device 1 further comprises a receiving lens (which is of known type and is not illustrated) that translates inside the container 2, and is tilted and tangential to the transparent portion of the frontal face 3 of the device 1 along a translation axis that is parallel to the longitudinal axis of the frontal face 3, to enable objects comprised in the interval of operational work distances to be detected. As known and as already achieved in the devices 1 that are available on the market, the optical adjustment trimmer 11 is connected directly to the receiving lens, inasmuch as the receiving lens is translatable towards the head face 4 or towards the bottom face 6, rotating the optical adjustment trimmer 11 in one direction or the other. With the translation, the receiving lens is able to direct the reflected light beam 16 in different positions of the photoreceiver means 15, i.e. along a receiving axis that goes from the second photoreceiver 19 to the first photoreceiver 17, passing through the non sensitive material zone.

As said previously, before the device is operative in the detecting condition in which an object is detected within the desired cut-off distance 8, the optical adjustment procedure must be conducted, to set this cut-off distance 8 in the interval of operational work distances. Owing to the optical adjustment trimmer 11 it is thus possible for an operator to perform the optical adjustment procedure and position the receiving lens in a suitable manner.

The optical adjustment procedure is nevertheless, according to the invention, comprised in a calibrating procedure, in which the device is activatable in a calibrating condition and at the end of which the device is activatable in a detecting condition. In the calibrating condition in fact, the values of the first 21 and of the second 22 signal are stored to have a first 21*b* and a second signal 22*b* stored in the calibrating condition.

In use, when the device 1 is in the detecting condition, the light beam 14 is emitted periodically at the sampling frequency to check the passage of an object 18. The processing means provides an output information signal, which is not only a function of a first 21*a* and of a second signal 22*a* in the detecting condition, but is also correlated with the values of the first 21*b* and of the second signal 22*b* stored in the calibrating condition. The information signal thus depends on the first 21*a* and on the second signal 22*a* in the detecting condition and on the first 21*b* and on the second signal 22*b* stored in the calibrating condition.

It should be noted that with 21*a* and 21*b* respectively the first signal 21 acquired in the detecting condition and in the calibrating condition is indicated, and with 22*a* and 22*b* respectively the second signal 22 acquired in the detecting condition and in the calibrating condition is indicated.

In particular, the information signal is obtainable by comparing the first signal 21*a* and/or the second signal 22*a* in the detecting condition with the respective first 21*b* and/or second signal 22*b* stored in the calibrating condition or more in detail by comparing the maximum amplitude of the first 21*a* and/or second 22*a* signal in the detecting condition with the maximum amplitude of the first 21*b* and/or second 22*b* signal stored in the calibrating condition.

A respective first and second threshold value are associated with the first 21 and second signal 22, in such a manner that the information signal indicates the presence of the object if the difference between the maximum amplitude of the first/second 21*a*/22*a* signal in the detecting condition and of the respective first/second 21*b*/22*b* signal in the calibrating condition, regardless of the sign between these differences, is greater than the respective threshold value.

By the term "and/or" indicated above, it is desired to indicate that it is possible to consider exclusively the comparison between values of the first signal 21 or of the second signal 22, but it may also be necessary to make a comparison between values of both the first 21 and the second signal. For example, a comparison of the difference between the first signal 21*a* (or second signal 22*a*) in the detecting condition and the respective first 21*b* signal (or second signal 22*b*) stored in the calibrating condition may be made and if this difference, regardless of the sign, is less than or the same as the first (or second) threshold value, also the difference between the second signal 22*a* (or first signal 21*a*) in the detecting condition and the respective second 22*b* signal (or first signal 21*b*) stored in the calibrating condition is compared and evaluated. On the other hand, if the difference between the first signal 21*a* (or second signal 22*a*) in the detecting condition and the respective first 21*b* signal (or second signal 22*b*) stored in the calibrating condition, regardless of the sign, is greater than the first threshold value, the comparison of the second signal 22*a*/22*b* (or first signal 21*a*/21*b*) is not carried out. According to a different embodiment of the present invention, for example for certain particular applications, it could on the other hand be opportune always to carry out the comparison between both the first 21 and the second 22 signal.

In the calibrating condition, the object is absent within the cut-off distance 8. In the absence of an object 18, the receiving means 15 receives a reflected light beam 16 from the background 20 and the first 21*b* and the second signal 22*b* in the calibrating condition are thus influenced only by the background 20.

As said previously, the fact that the emitted light means is not focussed on the cut-off distance 8, is focussed outside the interval of operational work distances or is instead collimated, ensures that the background 20 is impinged with an emitted light beam 14 having a set diameter that is greater than the desired minimum value.

In this manner, the first 21*b* and second 22*b* signal are indicative of the corresponding background 20, whatever type of background 20 is considered, also if the background 20, for example, has rough, hardly reflective surfaces, or with imprecisions, and also in the case of small variations in the position of the background during normal operation of the device. In fact, an emitted non-focussed or preferably collimated light beam 14, having a diameter that is greater than a desired minimum value in the work operating distances interval, i.e. in any position in which the cut-off distance 8 can be selected, ensures greater immunity both to the surface irregularities of the background 20 and to the accidental movements of the background 20 itself, which may occur during the detecting step. Such small movements could, for example, be due to vibrations and the background 20 could be in a different position during the detecting step compared with the position during the calibrating step.

As already said, the calibrating condition is activatable by an operator by means of a command performed by the adjusting and calibrating means during a calibrating procedure. By means of the calibrating trimmer 12, an operator can perform a command to activate the calibrating procedure, and can perform a further command to terminate the calibrating procedure. With this further command, the calibrating condition wherein are stored the first 21*b* and the second 22*b* signal, the calibrating procedure is subsequently terminated and the operative operation of the device 1 is subsequently activated in a detecting condition.

The processing means is for this reason connected to the adjusting and calibrating means. A first arrangement, for example a limit switch in a clockwise direction of the calibrating trimmer 12, is associable with the activating command of the calibrating procedure, a second arrangement, for example a limit switch in an anticlockwise direction, of the calibrating trimmer 12 is on the other hand associable with the further calibrating condition activation command and the calibrating procedure end command.

Between the calibrating procedure activation command and the calibrating procedure end command, the operator is nevertheless requested to operate manually, by means of the optical adjustment trimmer 11, the optical adjustment procedure of the cut-off distance 8, translating the receiving lens. The calibrating condition is activatable at the end of the optical adjustment procedure.

The optical adjustment procedure provides, with the device positioned opposite the background 20, for an operator rotating an adjusting trimmer 11 clockwise, thus translating the receiving lens, until the reflected light beam 16 is directed from the background 20 to the first NEAR photoreceiver 17. The operator has the yellow LED 10 at his disposal to have an indication of how much the optical adjustment trimmer 11 has to be rotated. In particular, he has to act in such a manner that the yellow LED, which is directly connected to activation of the information signal 10, comes on.

Nevertheless, the manner according to the invention, illustrated previously, with which the information signal is activatable in a detecting condition differs from the manner in which the signal is activatable during the calibrating procedure, and in particular during the optical adjustment procedure.

During the optical adjustment procedure, the first 21*b* and the second 22*b* signal have not yet been stored.

Accordingly, during this procedure, the information signal is obtainable according to what is already known in background suppression devices that are present on the market. The processing means compares the first signal 21 acquired with the second signal 22 acquired and evaluates a differential signal between the first 21 and the second 22 signal, to identify whether the first 17 or the second 19 photoreceiver is more impinged by the reflected light beam 16. The information signal is activated and then the yellow LED 10 comes on, if the first NEAR photoreceiver 17 receives more reflected light than the second FAR photoreceiver 19.

By acting again on the adjusting trimmer 11, the operator has to move the receiving lens to direct the reflected light beam 16 from the first NEAR photoreceiver 17 to the second FAR photoreceiver 19, passing through the non-sensitive material zone, in such a way as to switch off the yellow LED 10 visually. In other words, the light beam 16 reflected by the background has to be directed to the FAR photoreceiver 19, but immediately outside the zone of non-sensitive material. A set distance on the optical emission axis, which is the cut-off distance 8, corresponds to this positioning of the receiving lens.

When this adjustment of the receiving lens has been reached, and the optical adjustment procedure has thus been concluded, the operator has to perform the further command to declare the calibrating procedure terminated. The further command activates the calibrating condition at which the first 21b and the second 22b signal are stored.

Figure 2:
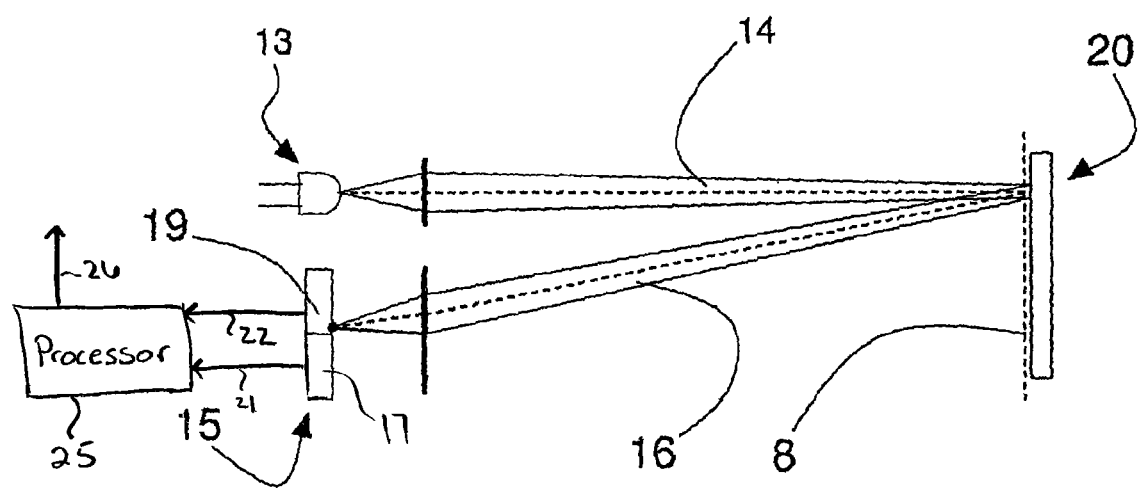
FIG. 2 shows a schematic representation of the operation of the background suppression device of the present invention at the end of the calibrating procedure, at the moment in which a first and second calibrating signal are stored.
Figure 3:
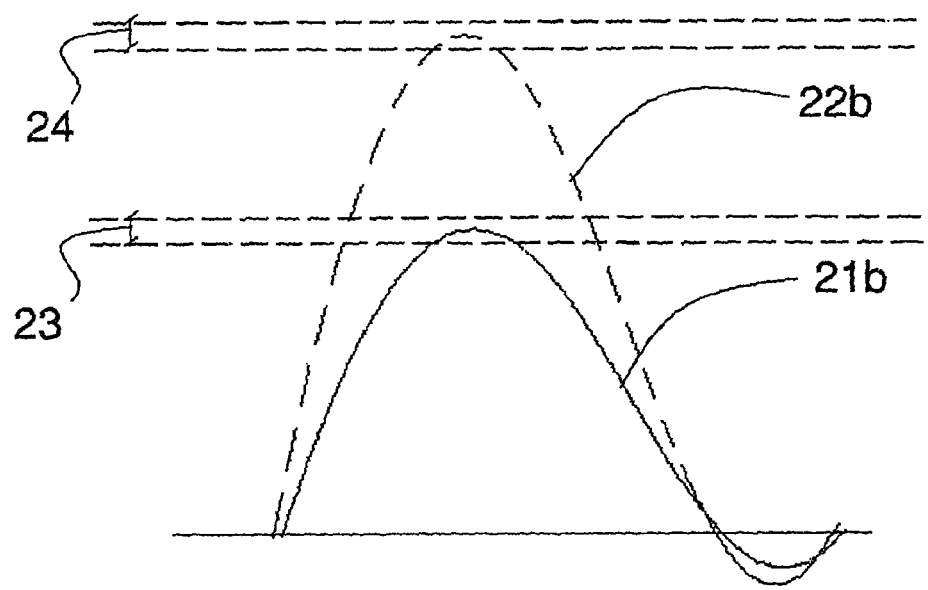
FIG. 3 shows the trend over time of a first and of a second electric signal provided by the photoreceiver means, during the operation illustrated in FIG. 2.

As shown in FIG. 2 and FIG. 3, at the end of the adjustment of the receiving lens the reflected light beam 16 is directed at the second FAR photoreceiver 19 and accordingly the second signal 22b has a maximum amplitude that is greater than that of the first signal 21b. The processing means samples the first 21b and second signal 22b at the maximum peak value of these signals and for each signal associates the respective threshold value with this peak value. By calculating for each signal twice the respective threshold value, it is possible to associate with each signal 21 and 22 a respective threshold interval 23 and 24 around the peak value of each signal 21 and 22, that identifies respectively a minimum and maximum permitted amplitude value associated with the first signal 21 and a minimum and maximum permitted amplitude value associated with the second signal 22.

In use, with the device operative and in a detecting condition, each variation of the first 21a and/or of the second 22a signal with respect to what is stored in the calibrating condition indicates a variation in the light conditions within the cut-off distance 8. If the detected first 21a and/or second 22a signal goes outside the corresponding threshold interval 23 or 24, the background suppression device indicates the presence of an object. In other words, if the first 21a and/or second 22a signal are respectively less than the minimum amplitude value or greater than the maximum amplitude value associated with each signal, the background suppression device indicates the presence of an object.

Figure 4:
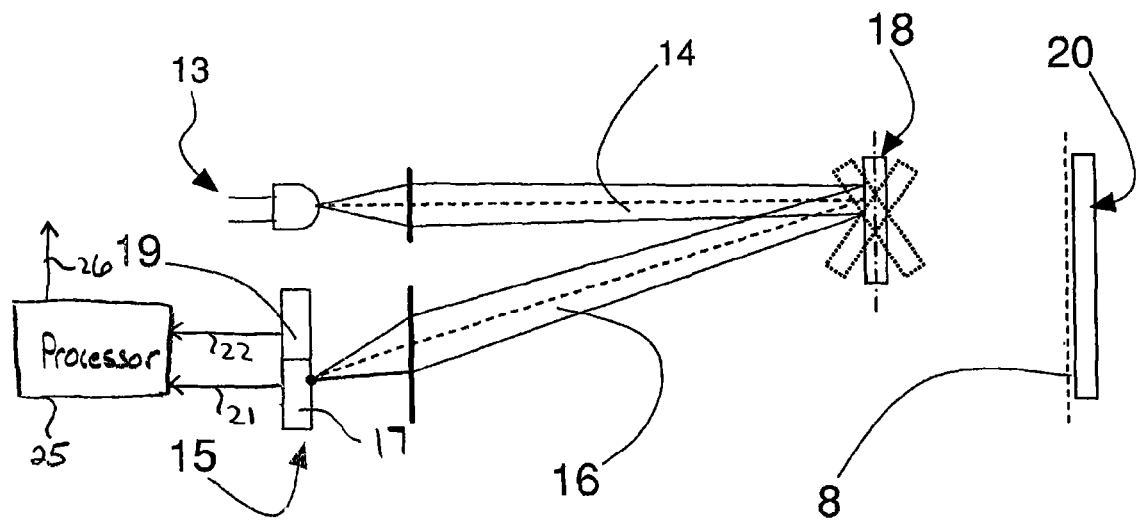
FIG. 4 shows a schematic representation of the operation of the background suppression device of the present invention in a detecting condition during the passage of an opaque object.
Figure 5:
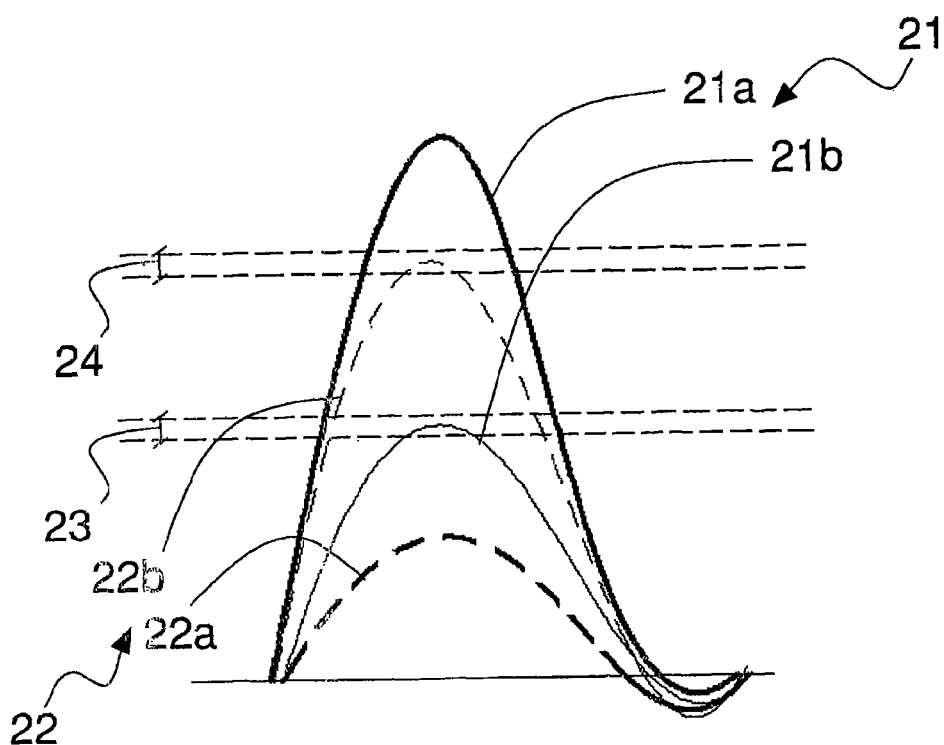
FIG. 5 shows the trend over time of a first and of a second electric signal provided by the photoreceiver means, during the operation illustrated in FIG. 4.

At the passage of an opaque object, as illustrated in FIGS. 4 and 5, the light beam 16 reflected by the object 18 is directed to the first NEAR photoreceiver 17. The first signal 21a differs significantly from the first signal 21b and is outside the first threshold interval 23, and accordingly the passage of an object 18 is identifiable. It should be noted that the position in which the reflected light beam 16 impinges the receiving means depends exclusively on the angle between the emitted light beam 14 and the reflected light beam 16, which in turn depends on the distance of the object 18 from the device 1. Possible tilts of the object 18, which are shown by a dotted line in FIG. 5, do not change this angle and are thus insignificant for the purposes of detecting the object.

In FIGS. 6, 7, 8 and 9 the passage of a reflective or partially reflective object is shown, which is able to orient the reflected light beam 16 in a different direction from an opaque object. In fact, if the object has external mirror surfaces, the reflected light beam 16 is directed to the receiving means 15 with a tilt that is influenced both by the distance of the object from the emitting means and also by the orientation of the object with respect to the optical axis of the emitted beam 14.

Figure 6:
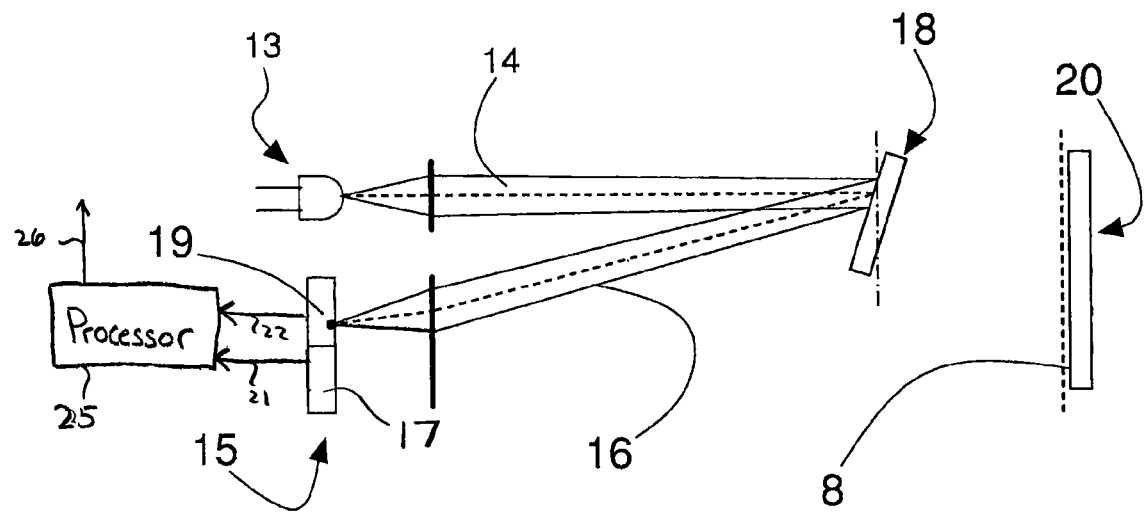
FIG. 6 shows a schematic representation of the operation of the background suppression device of the present invention, in a detecting condition during the passage of a shiny object.
Figure 7:
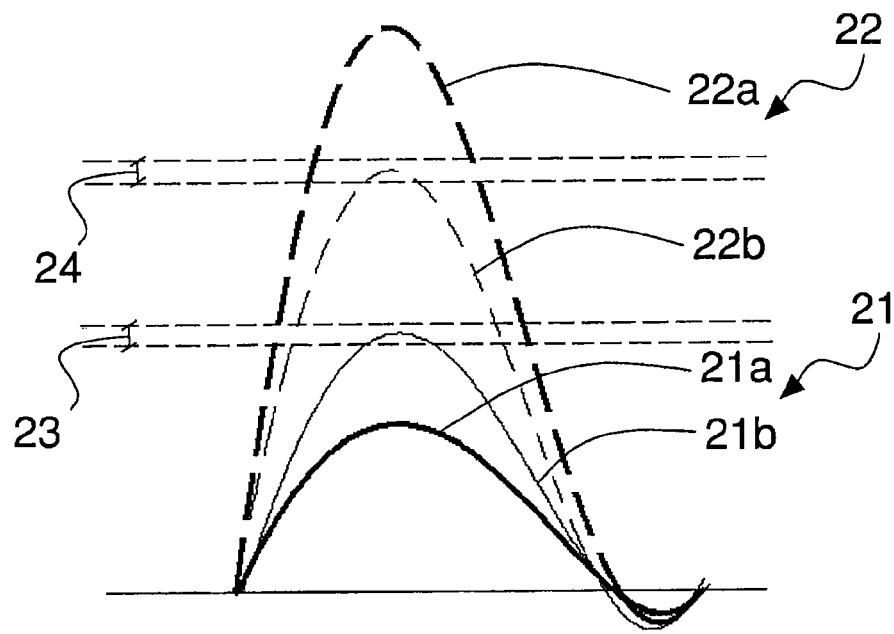
FIG. 7 shows the trend over time of a first and of a second electric signal provided by the photoreceiver means, during the operation illustrated in FIG. 6.

For example, as shown in FIGS. 6 and 7, the second FAR photoreceiver 19 receives the light beam 16 reflected by the object 18. Both the first 21a and the second 22a signal differ significantly from the respective first 21b and second 22b signal and are beyond the respective threshold intervals 23 and 24. By considering even one of the two signals, it is possible to identify the passage of an object 18.

Figure 8:
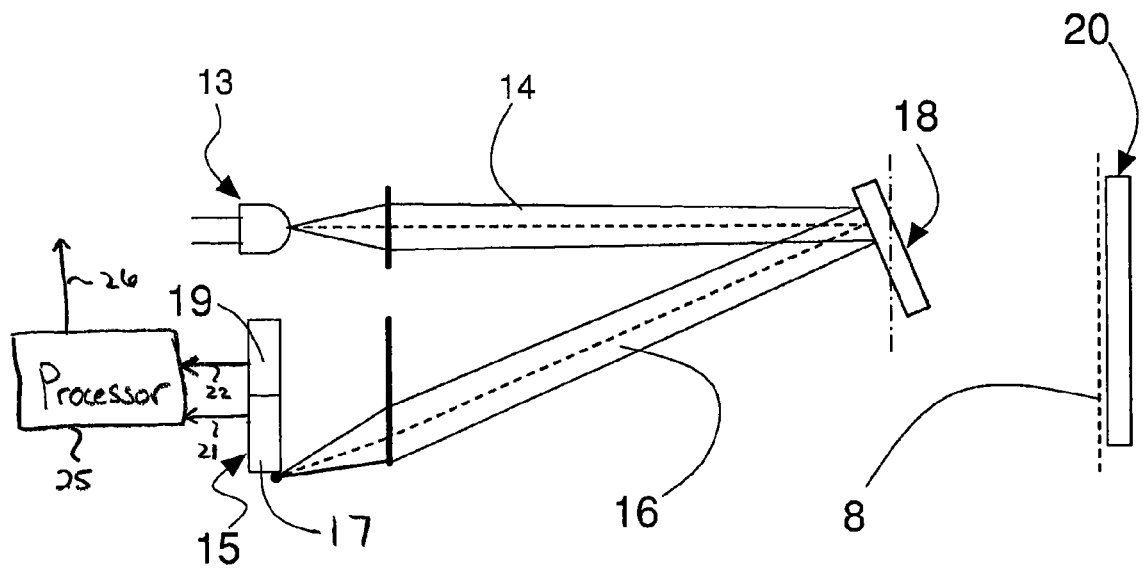
FIG. 8 shows a schematic representation of the operation of the background suppression device of the present invention, in a detecting condition during the passage of a shiny object, that directs a reflected light beam outside the background suppression device.
Figure 9:
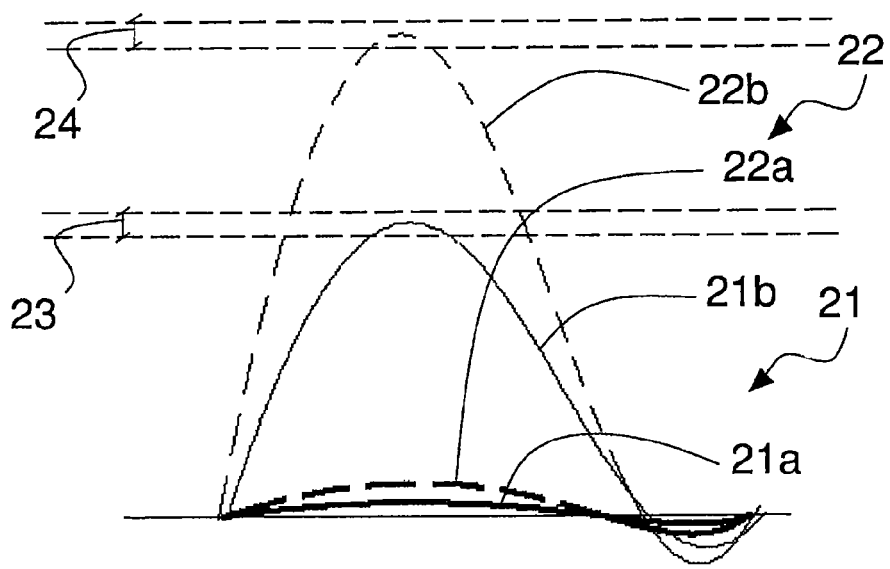
FIG. 9 shows the trend over time of a first and of a second electric signal provided by the photoreceiver means; during the operation illustrated in FIG. 8.

If, on the other hand, as shown in FIGS. 8 and 9, the reflected light beam 16 is directed by the object almost completely outside the photoreceiver means and the first 17 and the second 19 photoreceiver receive a quantity of reflected light that is close to zero, as if they aimed at empty space. Both the first 21a and the second 22a signal detected are close to zero but, also in this case, as the difference between the first and/or second signal detected in the detecting and calibration condition is greater than the respective first and second threshold value, the processing means is able to associate this condition with the presence of an object.

As is evident, the background suppression device of the present invention is able to detect any opaque or shiny object within the cut-off distance 8.

This is made possible by storing the first 21 and of the second 22 signal, identified in a set condition, which is the calibrating condition, and used as a comparison during the operation of the device in the detecting condition.

It is pointed out that the value of the first 23 and of the second 24 threshold interval, i.e. of the first and second threshold value, are predetermined and stored in the processing means when the device is produced. The maximum and minimum permitted amplitude value associated with the first signal 21a and the maximum and minimum permitted amplitude value associated with the second signal 22a are on the other hand calculated in the calibrating condition, from the maximum peak value of the first 21b and of the second signal 22b, which depend on the particular background 20 considered. Nevertheless, it is possible that these threshold intervals may vary through specific applications of different type and in this case a different embodiment or a different configuration of the device may correspond to each application.

This enables a very simple device to be obtained that has only two photoreceivers and has great detecting precision. Owing also to the possibility of varying the threshold interval, the device ensures high applicational flexibility, i.e. being installable to detect objects of various types. It should further be noted that the device of the present invention is able to detect the presence of an object 18 also in those conditions in which the devices that are already known on the market would be deceived, such as for example in the situations shown in FIGS. 6 and 8.

Preferably, the calibrating condition, in addition to being commanded by an operator inside the calibrating procedure, as illustrated previously, is automatically activatable periodically by the processing means, without the need for an optical adjustment procedure.

In fact, if the background 20 opposite which the device 1 is positioned gets dirty and/or worn, a slow change takes place over time in the background 20 and the first 21*b* and second 22*b* signal stored in the more recent calibrating condition may no longer be indicative of the background. In other words, the first 21*b* and second 22*b* signal in the calibrating condition have to be stored again without a movement of the receiving lens having to be requested.

The processing means, by activating at predefined intervals of time the calibrating condition during and simultaneously with the detecting condition, is able to store the first 21 and second 22 signal associated with the emitted light beam 14 when the object 18 is absent within the cut-off distance 8. In other words, the first 21*b* and second 22*b* signal in the calibrating condition, which are associable with the background 20, can be periodically acquired and stored by the processing means. In other words, it is the very processing means that establishes a calibrating condition for the device 1 and in this manner the device 1 is able to adopt to slow changes over time to the background 20.

An intervention by an operator and activation of the calibrating procedure is nevertheless necessary if the background 20 changes substantially. This could be required either because the device 1 moves to a different position or because the background 20 changes colour.

According to an alternative version of the present invention, the first 21*b* and second 22*b* signal in the calibrating condition are pre-stored when the background suppression device 1 is manufactured, for a specific cut-off distance, without any need for the operator to activate the calibrating procedure. In this case, however, it is necessary to associate a set background with the device, which is the same as the one used to memorise the first 21*b* and the second 22*b* signal during production of the device 1, and to install both the background and the device at the specific cut-off distance.

According to an alternative version of the present invention, the information signal is obtainable by creating a differential signal in the detecting condition of the first 21*a* and of the second 22*a* signal, by means of which it is possible to evaluate whether the first 17 or the second 19 photoreceiver is more impinged by the reflected light beam 16. In other words, it is evaluated which of the two, the first 21*a* or second signal 22*a* prevails over the other, i.e. is of greater amplitude than the other. If from the analysis of the differential signal in the detecting condition it emerges that the reflected light beam is received by the second FAR photoreceiver 19, as if the object were absent, the first 21*a* and/or the second 22*a* signal in the detecting condition are compared with the first 21*b* and/or the second 22*b* signal in the calibrating condition. Only at the end of this check and only if the difference between the first signal 21*a* in the detecting condition and the first signal 21*b* in the calibrating condition, regardless of the sign, is greater than the first threshold value and/or the difference between the second signal 22*a* in the detecting condition and the second signal 22*b* in the calibrating condition, regardless of the sign, is greater than the second threshold value, does the processing means emit the information signal indicating the presence of the object 18.

What is claimed is:

1. A background suppression device comprising emitting means emitting a light beam emitted in a set direction; optoelectronic receiving means which is suitable for receiving a light beam reflected by an object and for providing a first and a second signal; processing means that is suitable for receiving, in a detecting condition of said device, said first and second signal and for providing an output information signal, as a function of said first and said second signal, indicating the presence or absence of said object within an interval of set distances; wherein said processing means is suitable for storing, in a calibrating condition of said device during which a calibrating procedure for said device is performed, said first and said second signal and for providing said output information signal as a function of said first and/or said second signal obtained in said detecting condition and of said first and/or said second signal stored in said calibrating condition, wherein a set limit distance of said interval of set distances is selectable in an interval of operational work distances, said emitted light beam not being focused or being substantially collimated in said interval of operational work distances, wherein said emitted light beam has a diameter when impinging at a background that is greater than a desired minimum diameter value, said device comprising a focussing lens or collimating lens between said emitting means and said background, and wherein the device further comprises adjusting and calibrating means allowing manual control of an adjustable receiving lens to direct the reflected light beam to different positions of the optoelectronic receiving means.

2. The device according to claim 1, wherein said first signal is associable with a light beam reflected by an object within said interval of set distances and said second signal is associable with a light beam reflected by the background.

3. The device according to claim 1, wherein said information signal is obtainable by comparing said first signal in said detecting condition with said first signal in the calibrating condition and/or said second signal in said detecting condition with said second signal in the calibrating condition.

4. The device according to claim 1, wherein said information signal is obtainable by creating a differential signal in said detecting condition of said first and said second signal and making a comparison between said first signal in said detecting condition and said first signal in the calibrating condition and/or between said second signal in said detecting condition and said second signal in the calibrating condition, if said differential signal indicates the absence of said object.

5. The device according to claim 4, wherein said processing means is suitable for making said comparison if said second signal has a greater amplitude than said first signal.

6. The device according to claim 1, wherein said processing means is suitable for providing said information signal comparing respective amplitudes of said first and/or second signal in said detecting condition and in said calibrating condition.

7. The device according to claim 6, wherein said information signal is suitable for indicating the presence of said object if the difference between the maximum amplitude of said first signal in the detecting condition and of said first signal in the calibrating condition, regardless of the sign of said difference, is greater than a first threshold value.

8. The device according to claim 6, wherein said information signal is suitable for indicating the presence of said object if the difference between the maximum amplitude of said second signal in the detecting condition and of said second signal in the calibrating condition, regardless of the sign of said difference, is greater than a second threshold value.

9. The device according to claim 1, wherein said object is absent within said interval of set distances in said calibrating condition, said optoelectronic receiving means being suitable in said calibrating condition for receiving said light beam reflected by a background.

10. The device according to claim 1, wherein said calibrating condition being activatable by an operator via said adjusting and calibrating means.

11. The device according to claim 10, wherein said adjusting and calibrating means comprises a calibrating trimmer, a first arrangement of said trimmer being associable with a command activating the calibrating procedure, a second arrangement of said trimmer being associable with a further command activating said calibrating condition and terminating said calibrating procedure.

12. The device according to claim 10, wherein said adjusting and calibrating means comprises an optical adjustment trimmer to perform an optical adjustment procedure to adjust a set limit distance of said interval of set distances.

13. The device according to claim 1, wherein said calibrating condition is activatable at intervals of time predefined by said processing means during and simultaneously with said detecting condition, when said object is absent within said interval of set distances.

14. The device according to claim 1, wherein said emitted light has a diameter in the interval of operational work distances between 3 mm and 5 mm.

15. A method for detecting an object with background suppression, comprising the following steps: emitting a light beam in a set direction; receiving a light beam reflected by an object to provide a first and a second signal; processing said first and said second signal in a detecting condition and, as a function of said first and said second signal, providing an output information signal indicating the presence or absence of said object inside an interval of set distances; wherein said processing comprises the step of storing said first and said second signal in a calibrating condition during which a calibrating procedure for said device is performed, to provide said output information signal as a function of said first and/or said second signal obtained in said detecting condition and of said first and/or said second signal stored in said calibrating condition, the method further comprising:
    selecting in an interval of operational work distances a set limit distance of said interval of set distances and acting in such a way that in said interval of operational work distances said emitted light beam is not focused or substantially collimated,
    wherein said emitted light beam has a diameter when impinging at a background that is greater than a desired minimum diameter value, and
    wherein the calibrating procedure includes an optical adjustment procedure during which a receiving lens is manually adjusted to direct the reflected light beam to different positions of an optoelectronic receiving means.

16. The method according to claim 15, and comprising associating said first signal with a light beam reflected by an object within said interval of set distances and said second signal with a light beam reflected by the background.

17. The method according to claim 15, wherein said providing said output information signal comprises comparing said first signal in said detecting condition with said first signal in the calibrating condition and/or said second signal in said detecting condition with said second signal in the calibrating condition.

18. The method according to claim 15, wherein said providing said output information signal comprises creating a differential signal in said detecting condition of said first and said second signal and making a comparison between said first signal in said detecting condition and said first signal in the calibrating condition and/or said second signal in said detecting condition and said second signal in the calibrating condition, if said differential signal indicates the absence of said object.

19. The method according to claim 18, wherein said comparison is made if said second signal has a greater amplitude than said first signal.

20. The method according to claim 15, wherein said processing comprises providing said information signal comparing respective amplitudes of said first and/or second signal in said detecting condition and in said calibrating condition.

21. The method according to claim 20, and comprising indicating the presence of said object if the difference between the maximum amplitude of said first signal in the detecting condition and of said first signal in the calibrating condition, regardless of the sign of said difference, is greater than a first threshold value.

22. The method according to claim 20, and comprising indicating the presence of said object if the difference between the maximum amplitude of said second signal in the detecting condition and of said second signal in the calibrating condition, regardless of the sign of said difference, is greater than a second threshold value.

23. The method according to claim 15, and comprising making said calibrating condition correspond to the absence of said object, to receive said light beam reflected by a background.

24. The method according to claim 15, and comprising activating by an operator said calibrating condition by adjusting and calibrating means.

25. The method according to claim 24, and comprising activating by a first arrangement of a calibrating trimmer of said adjusting and calibrating means the calibrating procedure and activating by a second arrangement of said trimmer said calibrating condition, said calibrating condition being activatable subsequently to the activation of said calibrating procedure.

26. The method according to claim 25, and comprising performing by means of the operator the optical adjustment procedure by means of an optical adjustment trimmer of said adjusting and calibrating means, said optical adjustment procedure being activatable subsequently to the activation of said calibrating procedure.

27. The method according to claim 26, and comprising terminating said optical adjustment procedure, said calibrating condition being activatable subsequently to the end of said optical adjustment procedure.

28. The method according to claim 25, and comprising terminating said calibrating procedure after said activation of said calibrating condition and subsequently activating said detecting condition.

29. The method according to claim 15, wherein said processing comprises activating said calibrating condition at predefined intervals of time during and simultaneously with said detecting condition, when said object is absent within said interval of set distances.

* * * * *